Aug. 21, 1928.
A. D. KOONTZ ET AL
1,681,616
COUPLER FOR MINE CARS
Filed June 30, 1927  2 Sheets-Sheet 1
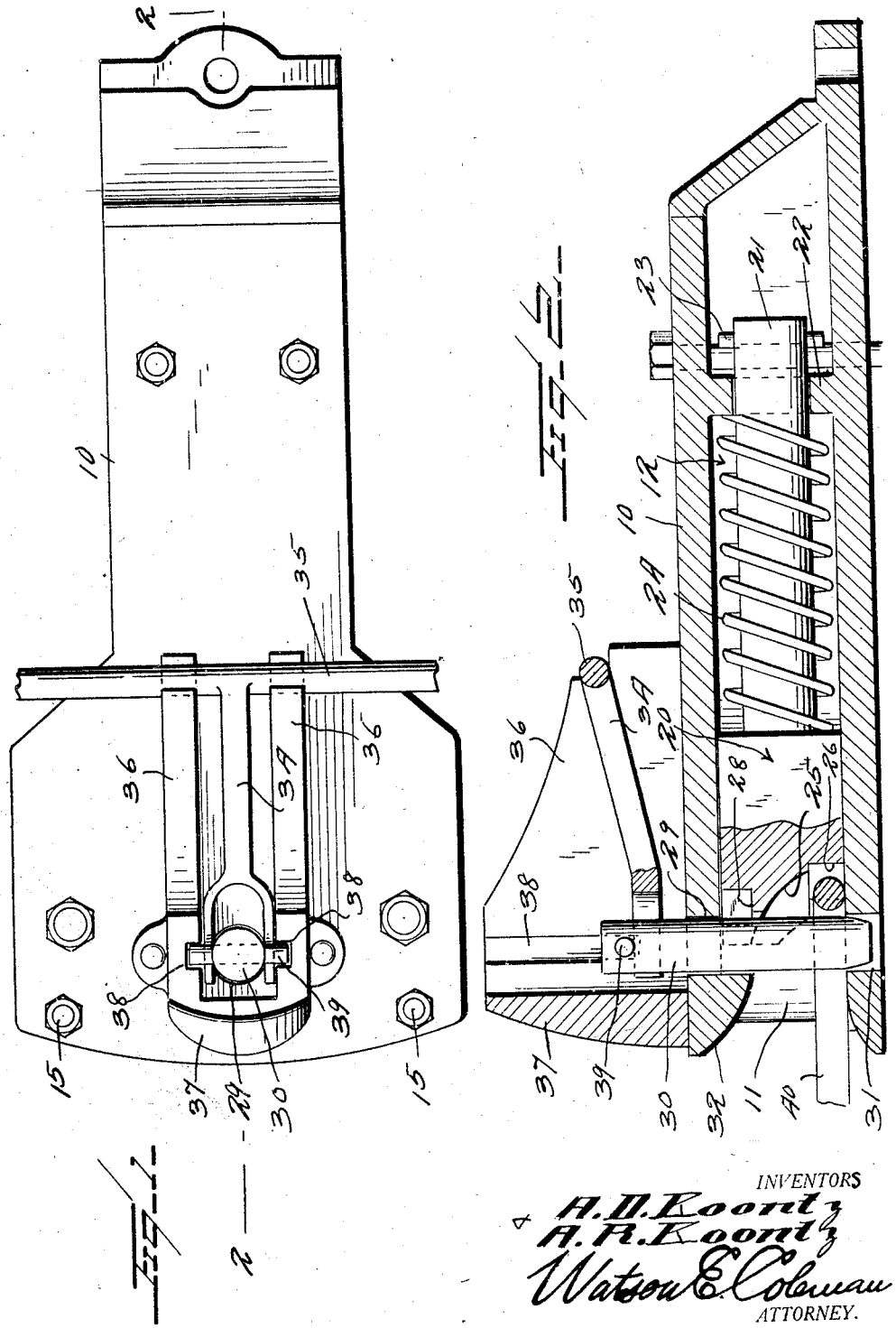
INVENTORS
A. D. Koontz
A. R. Koontz
Watson E. Coleman
ATTORNEY.

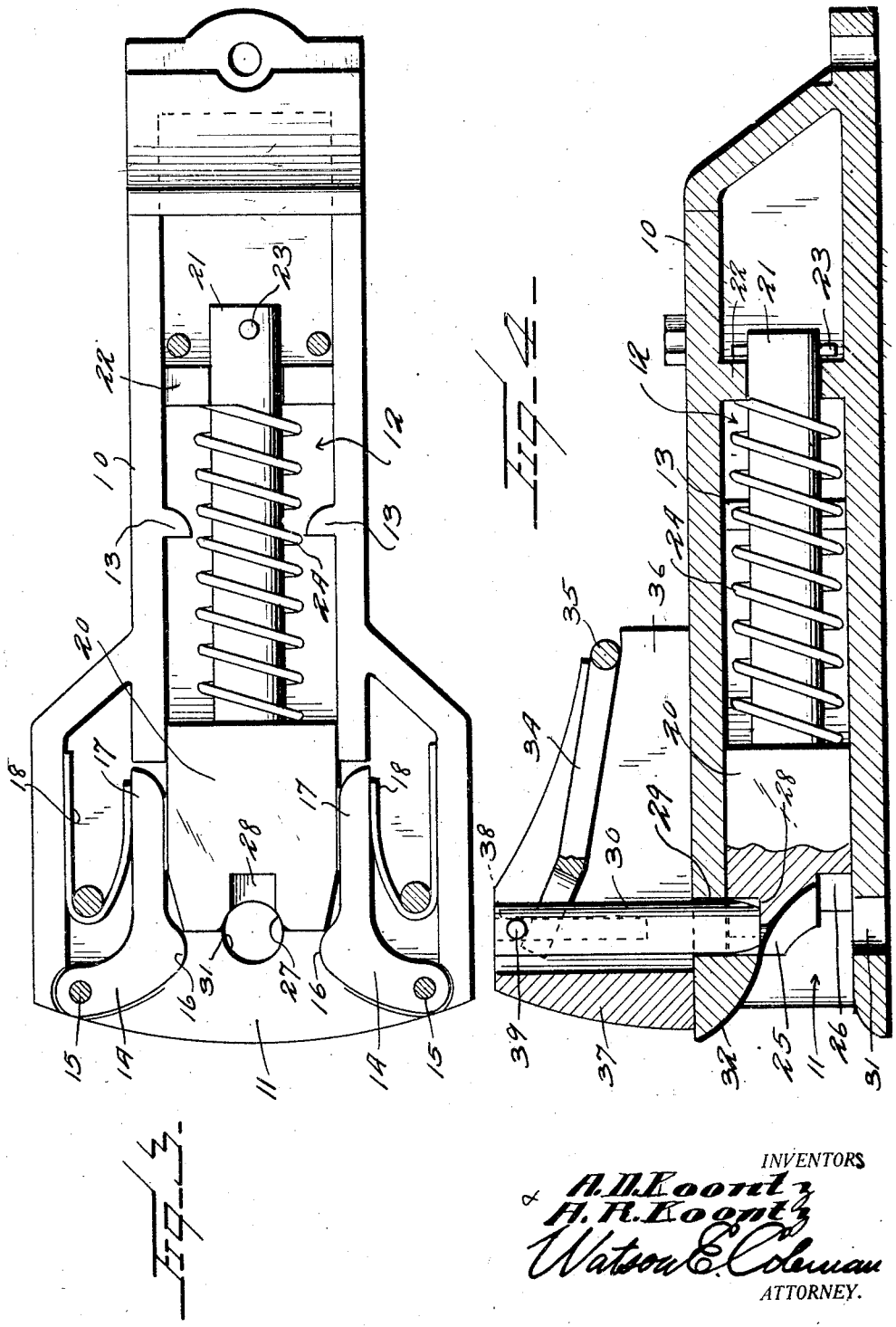

Patented Aug. 21, 1928.

1,681,616

UNITED STATES PATENT OFFICE.

ALBERT D. KOONTZ AND AIDRIAN R. KOONTZ, OF CHARLESTON, WEST VIRGINIA; CLARA B. KOONTZ, EXECUTRIX OF SAID AIDRIAN R. KOONTZ, DECEASED, ASSIGNORS OF ONE-THIRD TO CHARLES LUCAS.

COUPLER FOR MINE CARS.

Application filed June 30, 1927. Serial No. 202,634.

This invention relates to mine car couplings, and the general object of the invention is to provide a coupling device for mine cars which will provide means for locking the coupling pin in a raised position when the coupling is effected and automatically causing the dropping of the pin into place.

A further object is to provide a buffer against which the coupling strikes when the cars are coupled to thereby take up the shock and jar.

Still another object is to provide a construction of this character wherein the coupling pin is adapted to be raised by a lever and automatically held in this raised position until the coupling link is inserted in the coupling head, whereupon the pin is released.

Our invention is illustrated in the accompanying drawings, wherein:—

Figure 1 is a top plan view of a coupling constructed in accordance with our invention;

Figure 2 is a longitudinal section on the line 2—2 of Figure 1;

Figure 3 is a top plan view with the upper wall of the coupling removed;

Figure 4 is a section on the same line as Figure 2 but showing the pin raised.

Referring to these drawings, 10 designates a coupling head which is bolted or otherwise attached to the car. This coupling head is formed with a transversely enlarged chamber 11 at its forward end and with a spring chamber 12 extending rearward from the chamber 11 and formed with the inwardly extending buffer stops 13.

Disposed at the mouth of the coupling and within the chamber 11 are the somewhat angular bumper arms 14 which are pivoted at 15 and have their inner faces so formed as to provide a protuberant portion 16 which merges into a slight recess or concavity and then gradually extends rearward and outward, as at 17. A spring 18 having two arms is mounted within the chamber 11 in conjunction with each bumper arm and bears against the corresponding bumper arm so that these springs urge the bumper arms outward.

Operating within the chamber 12 and fitting the same is the head 20 of a pin 21. This pin 21 extends rearward through the chamber 12 and through an aperture in a transversely extending web 22. The rear end of this pin beyond the web 22 is intersected by a pin 23. Surrounding the pin 21 is a coiled compression spring 24 which urges the head of the pin 20 forward. The forward end of the head 20 is downwardly and inwardly cut away at 25 and below this cut-away portion is formed with the inwardly extending recess 26. A somewhat semi-circular aperture 27 extends downward through the head 20 and the wall of this aperture is formed with the ledge 28. The upper wall of the chamber 10 is formed with an aperture 29, and operating through this aperture is a coupling pin 30, the lower end of which is tapered.

The lower wall of the chamber 11 is formed with an aperture or seat 31 for this coupling pin 30. Forward of the aperture for the pin 30, the upper and lower walls of the chamber 11 are curved outward and upward to provide a mouth 32, the curved face of the upper wall coinciding with the curved face 25 on the head 20. The coupling pin 30 is mounted upon a lever 34, which in turn is mounted upon a transverse rock shaft 35 which may be connected to any suitable handle or other means whereby the pin may be lifted. This transverse rock shaft is mounted in a wall 36 which extends forward beyond the pin 30 and then transversely, as at 37. This wall 36 and 37 is attached to the upper face of the coupling head 10 in any suitable manner, as by screws, bolts or rivets. The inner faces of the walls 36 are longitudinally grooved, as at 38, and the transverse pin 39 that extends through the coupling pin has its ends operating in these grooves so as to act as a guide for the coupling pin. The coupling pin, of course, is adapted to engage any ordinary link, designated 40 in the drawings.

It will be noted that the downwardly inclined face 25 of the buffer head 20 terminates in a recess 26 which is large enough to receive the link 40 so that the link is guided into position within the coupling head by the inclined faces 32 at the end of the coupling head and then is guided downward into this recess 26 by the inclined face 25. A further inward movement of the link 40, of course, dislodges the coupling pin, as heretofore described, and the coupling pin drops through the link.

In the operation of this device, when the cars are coupled, the coupling link 40 is inserted into the mouth 32. At this time the pin 30 is raised and rests upon the ledge 28. As soon as the coupling pin has moved into the coupling head sufficiently to strike the wall of the recess 26 of head 20, the coupling pin will force this head 20 back against the action of the spring 24, and this releases the coupling pin, which falls downward through the link 40 and the coupling is, of course, automatically effected. The link 40 pushes backward on the head 20 until this head strikes against the buffer stops 13. When the link enters the coupling head, the link will push laterally upon the protuberant portions 16 of the bumper arms 14, pushing these arms inward against the action of the springs 18. When it is desired to uncouple the car, the pin 30 is raised by means of the shaft 35. It will be understood that the head 20 constitutes a cast iron buffer which yieldingly resists the inward movement of the link 40 and constitutes also a latch supporting the pin 30 in its raised position. The entire coupling head is made of cast steel except, of course, the springs.

The device is very simple, thoroughly effective for the purpose intended, is automatic in its action, and the buffer formed by the head 20 constitutes means whereby a jar is cushioned.

We claim:—

A coupler for mine cars including a coupler head open at one end for the reception of a link, the head being vertically apertured, oppositely disposed angular bumper arms pivoted at their forward ends in said opening in the coupler head, the bumper arms having their rear ends urged toward each other by springs and said bumper arms acting to center a link disposed within the coupler head, a coupling pin insertible through said aperture, a buffer slidably mounted within the coupling head, a spring resisting rearward movement of the buffer, the buffer having a downwardly inclined end face recessed to receive the link, the inclined face being intersected by a slot for the coupling pin and the slot being formed to provide a ledge to support the coupling pin in a raised position, a coupling pin extending down through the head and adapted to engage the link inserted in the head, and manually operable means at one side of the coupling head whereby the pin may be raised.

In testimony whereof we hereunto affix our signatures.

ALBERT D. KOONTZ.
AIDRIAN R. KOONTZ.